United States Patent [19]

Volenec

[11] 4,280,296
[45] Jul. 28, 1981

[54] TANDEM FISHHOOK

[76] Inventor: Donald C. Volenec, 5042 Frederick St., Omaha, Nebr. 68106

[21] Appl. No.: 21,431

[22] Filed: Mar. 19, 1979

[51] Int. Cl.³ ............................................. A01K 83/00
[52] U.S. Cl. ..................................... 43/44.81; 43/44.82
[58] Field of Search ................ 43/44.81, 44.82, 43.16, 43/44.8

[56] References Cited

U.S. PATENT DOCUMENTS

| | | | |
|---|---|---|---|
| 1,283,718 | 11/1918 | Ford | 43/44.82 |
| 1,357,678 | 11/1920 | Bain | 43/44.82 X |
| 1,468,572 | 9/1923 | Maeda | 43/44.82 |
| 1,620,589 | 3/1927 | Ackerman | 43/44.8 |
| 2,800,740 | 7/1957 | Glaze | 43/44.82 |
| 2,874,510 | 2/1959 | Fitzgerald | 43/44.81 |
| 2,989,817 | 6/1961 | Kepler | 43/44.81 X |

FOREIGN PATENT DOCUMENTS

| | | | |
|---|---|---|---|
| 1011553 | 7/1977 | Canada | 43/44.82 |
| 43038 | 9/1917 | Sweden | 43/44.82 |
| 973689 | 10/1964 | United Kingdom | 43/44.8 |

Primary Examiner—Harold D. Whitehead
Assistant Examiner—K. Bradford Adolphson
Attorney, Agent, or Firm—Hiram A. Sturges

[57] ABSTRACT

A tandem fishhook comprising a forward hook and a rearward hook, the hooks each having two opposite sides connected by a curved portion, one of the sides having a barbed end, the other of the sides of each of the hooks defining an elongated shank extending in a direction opposite to the convex side of the curved portion, the shanks being alongside each other, means rigidly interconnecting the shanks.

5 Claims, 11 Drawing Figures

TANDEM FISHHOOK

BACKGROUND OF THE INVENTION

In the past tandem hook assemblies have been made by having the eye of the trailing hook received on the curved part of the forward hook. This has a serious disadvantage in that the trailing hook is not rigidly held in plane between forward hook and to the line to which it is attached which would cause the loss of some fish which otherwise would have been caught.

It is, therefore, an object of this invention to provide various means for rigidly interconnecting the forward and rearward hooks.

Another disadvantage of the prior art is that both forward and rearward hooks have in the past been in the same plane; whereas, there is an advantage in having the hooks offset in planes slightly to the right and left of a vertical plane because fish do not ordinarily strike directly from the rear and with my offset hooks the fish can be more easily caught.

SUMMARY OF THE INVENTION

The major goal of this invention is to provide a tandem fishhok comprising a forward hook and a rearward hook.

Other goals are to provide for the rigid interconnection of the shanks to be done either by a loop of wire of one piece with the shanks and hooks or by the same with a weight around forward ends of the shanks.

Still another goal is to provide the interconnection of the shanks as being done by different methods involving a weighting member having an external eye which can be of of one piece with one of the hooks, or which can be of a separate piece of wire united to the hooks within a weighting member either by extending through eyes of the hooks or not.

Still a further goal is to provide tandem hooks with interconnected shanks and with eyes of each hook in forward alignment of the interconnection for attachment of the line to both of the eyes.

An important goal is to provide for the rigidly attached hooks to be offset in places one to the right and one to the left of a vertical plane by acute angles.

DESCRIPTION OF THE PREFERRED EMBODIMEMT

Figure 1:
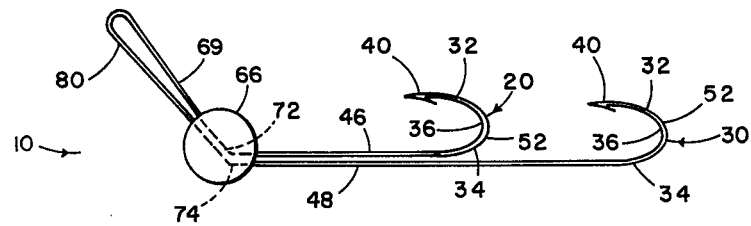
FIG. 1 is a side elevation of a tandem hook with a weight for holding the hooks in upwardly extending position.

The tandem fishhook of this invention is generally indicated at 10 in FIG. 1, and comprises a forward hook 20 and a rearward hook 30, the hooks each having two opposite sides 32 and 34, respectively, connected by a curved portion 36. One of the sides 32 has a barbed end 40.

The sides 34 of each of the hooks define an elongated shank 46 and 48, respectively, extending in an opposite direction to the convex side of the respective curved portion 36.

The shanks 46 and 48 are alongside each other and one above the other with the shank 46 of the forward hook above the shank 48 of the rearward hook.

Figure 2:
FIG. 2 is a top plan view of FIG. 1 showing that the hooks are offset to right and left of a vertical plane.

The hook shanks 46 and 48 are rigidly connected by one or more connectors, one of which is shown in FIG. 2 at 62, and a second connector is shown at 66 in FIG. 1, the second connector 66 being a weighting member since it has a much greater weight per unit of forward to rearward dimension along the tandem fishhook than either of the hooks 20 or 30.

The connector 62 is a loop of wire having ends connected at 72 and 74, respectively, to the forward ends of the shanks 46 and 48. The loop of wire 62 is preferably of one piece with the shanks 46 and 48 and also of one piece with their respective hooks 20 and 30.

The weighting member 66 can be formed of lead or any other suitable material and can be cast around the junction between the rearward ends of the wire loop 62 and the forward ends of the shanks 46 and 48. The wire loop 62 can extend upwardly to form an eye 80 disposed above and forwardly of the weighting member 66 so that the effect of the weighting member 66 is to hold the barbs 40 in positions above the shanks 46 and 48 as the hook is drawn through the water while trolling, for example, with the line connected to the eye 80. For this purpose the hooks 20 and 30 both have their curved portions 36 extending upwardly.

Referring to FIG. 2, a top plan view is shown of the curved portions 36 of the hooks, each of the curved portions lie in a plane and the planes defined by the curved portions 36 are disposed at an acute angle to each other with the planes converging toward their lower sides so that the hooks 20 and 30 have their curved portions 36 and their barbs 40 offset to the left and right, respectively, of a vertical plane extending between the planes of the respective curved portions 36 at times when the tandem fishhook of FIGS. 1 and 2 is being pulled through the water with its eye 80 in an upper position.

Figure 3:
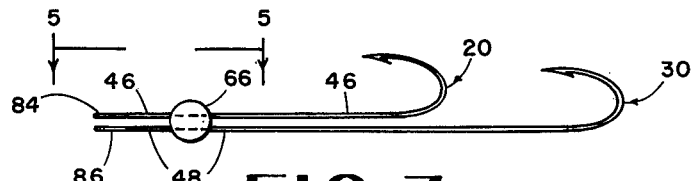
FIG. 3 is a modification in which the line is to be attached to two eyes.

Referring to FIG. 3, a modification of the hook of FIG. 1 is shown and has the shanks 46 and 48 identical to the shanks of the modification of FIG. 1, and has hooks 20 and 30 which are likewise identical and which also extend into a weighting member 66. However, in the modification of FIG. 3 the shanks 46 and 48 extend completely through the weighting member 66 to which they are attached, and the forward ends of the shanks 46 and 48 terminate in eyes 84 and 86, respectively.

Figure 5:
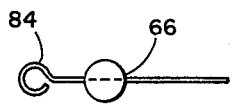
FIG. 5 is a view of the modification of FIG. 3 as seen along the line 5—5 of FIG. 3.

In FIG. 5 a top plan view of the forward end portion of FIG. 3 is shown along the line 5—5 and the eyes 84 and 86 are not both seen in FIG. 5, because one is directly below the other in alignment with the eyes 84 in horizontal planes.

Figure 4:
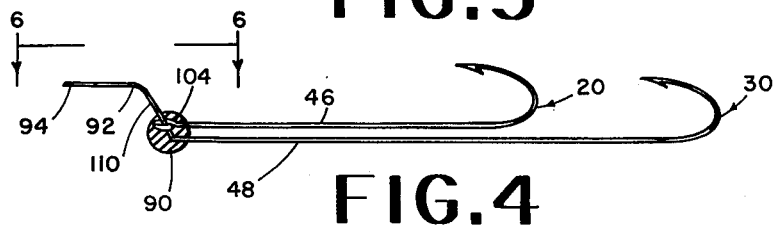
FIG. 4 is another modification in which the eye is of one piece with only one of the hooks with the closest half of a weighting member removed.
Figure 6:
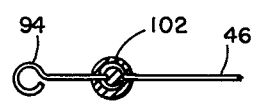
FIG. 6 is a modification of FIG. 4 as seen along the line 6—6 of FIG. 4, but with the upper half of a weight member removed.

In the modification of FIG. 4, the forward end of the shanks 46 and 48 likewise extend into a weighting member 90, but the forward end of the shank 48 extends upwardly in the middle of the member 90 and extends out the top of the member 90 and forwardly, as shown at 92, terminating in an eye 94, best seen in FIG. 6, at its forward end. The shank 46 of the forward hook 20 has an eye 104 which extends around the upwardly extending portion 110 of the shank 48.

Figure 7:
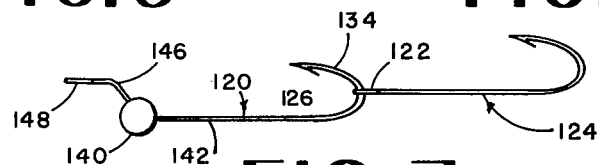
FIG. 7 is a view showing a prior art lead weighted tandem hook assembly.

In FIG. 7, an example of prior art construction is shown in which a forward hook 120 receives the eye 122 of a rearward hook 124, around the curved portions 126 of the forward hook 120. This has the disadvantage that the eyes 122 are conventionally of set sizes, and such sizes are small enough so that in assembly the barb 134 of the forward hook 120 becomes damaged while passing through the eye 122, whereby it is less effective or else must be smaller.

This construction of the prior art, shown in FIG. 7, has the further disadvantage that the rearward hook 124 can swing freely on the forward hook 120 and the lack of rigid is very undesirable.

In FIG. 7 a weighting member 140 is shown to be a conventional part of the prior art and the shank 142 of the forward hook 120 extends out of the top of the weighting member, as seen at 146, terminating in an eye 148.

Figure 8:
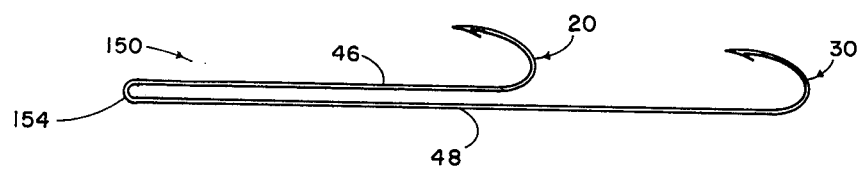
FIG. 8 is a side elevation of a further modification of the tandem hook assembly and in which both hooks and their interconnection are of one piece of wire.

Referring to FIG. 8, a further modification of the tandem hook of this invention is there shown as indicated at 150, in which the hooks 20 and 30, previously described, and having shanks 46 and 48 simply have the forward ends of their shanks interconnected at 154 by a portion of the same wire of which both hooks 20 and 30 are made. The hooks 20 and 30 can otherwise be the same in position and construction as the hooks 20 and 30 of FIGS. 1 to 4.

Figure 9:
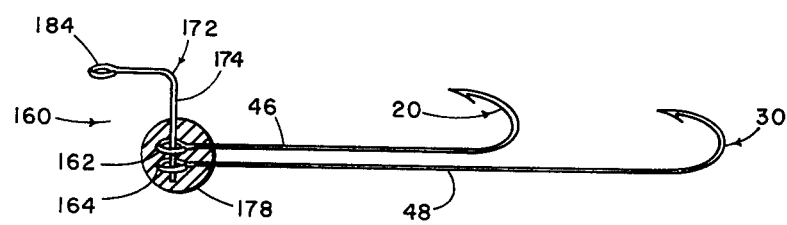
FIG. 9 is a modification in which hook eyes are held to a forwardmost eye by an eye wire in a weight, the closest half of the weight being broken away.

Referring to FIG. 9, a still further modification is there shown at 160 of the tandem hook. In the tandem hook 160 the forward and rearward hooks 20 and 30 are the same as described in the other modifications, but the forward ends of their shanks 46 and 48 are each provided with an eye 160 to 164, respectively. These eyes are disposed substantially, but not necessarily, in horizontal planes, and a wire 172 is provided with a portion 174 extending down through the eyes 162 and 164, and held in place in this position by having the eyes 162 and 164 embedded in a weighting member 178. The wire 172 extends forwardly at its upper end to an eye 184. When the eye 184 is normally upward, because of the effect of the weighting member 178, then the hooks 20 and 30 both extend upward from their shanks 46 and 48 also, and, therefore, do not catch on the debris on the bottom of a body of water.

Figure 10:
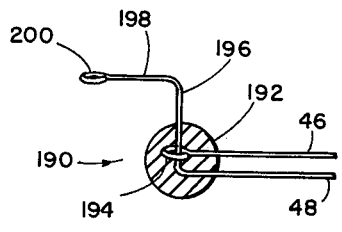
FIG. 10 is a modification of the forward end of the assembly of FIG. 9 in which the forward eye is of one piece with one of the hooks, the shank of the rear hook having an upwardly extending portion extending through the eye of the hook.

FIG. 10 shows at 190 a modification of the tandem hook, in which the shanks 46 and 48 of two hooks are connected partly by a weighting member 192, which extends around an eye 194 in the forward end of the shank 48, and also around an upwardly offset portion 196 of the shank 48, which extends upwardly through the eye 194, and out of the weighting member 192, to be connected to a forwardly extending portion 198 of the shank 48, which latter terminates in an eye 200.

The tandem hook 190 of FIG. 10 is in all respects identical to the tandem hook 160 of FIG. 9 at points rearwardly of the weighting member 192.

Figure 11:
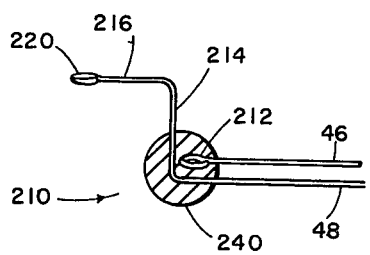
FIG. 11 is a modification in which the eye of the forward hook is secured to an upwardly offset portion of the shank of the lower hook by embedment in a weight member.

Referring to FIG. 11, is another modification 210 of the tandem hook, and in which the shanks 46 and 48 terminate, respectively, in an eye 212 and in an upwardly extending portion 214, connected to a forwardly extending portion 216, having an eye 220 on its forward end. The remainder of the tandem hooks 210 rearwardly of a connector 240, extending around the eye 212, and the upwardly extending portion 214 at its lower end, are the same as the tandem hook of FIG. 9, shown at 160.

In the modification of FIG. 8 the shank portions 46 and 48 can have portions in contact a short distance rearwardly of the connecting portion 154 to in effect will form an eye at the forward end of the tandem hook. This can be done either by having only one shank offset toward the other, both shanks partly offset until they touch, or another way is to have the shank portions 46 and 48 substantially touching with forward ends each partly outwardly offset to meet the outer ends of the connecting portion 154 so as to form an eye immediately rearward of the connecting portion 154.

As best seen in FIGS. 1 and 2, the curved portions 36 of the forward hook 20 and rearward hook 30 both can extend upwardly from the shanks 46 and 48 at the same time, and at that same time the centers of the curved portions 36 of each hook are disposed on opposite sides of a reference plane, not shown, extending along said shanks and extending substantially through the center of an area in which the shanks are disposed.

The terminal tip of the barbed end 40 of the forward hook 20 points forwardly and is disposed a substantial distance forwardly of the forward-pointing tip of the barbed end 40 of the rearward hook 30.

The shanks 46 and 48 are interconnected by the weighting member 66 which is of substantially greater weight in proportion to its forward-to-rearward dimension than the combined weight of the two shanks along an equal forward-to-rearward dimension along the two of the shanks.

The forward ends of the hook shanks terminate in aligned eyes inside the weighting member 66 as seen in FIG. 9. The wire 174 is imbedded inside the weighting member 66, as also seen in FIG. 9, and the wire 174 extends through the aligned eyes, and the wire 174 has an eye 184 thereon external of the weighting member 178.

I claim:

1. A tandem fish hook assembly comprising a forward hook and a rearward hook, said hooks each having two opposite sides connected by a curved portion with a convex side and a center, one of said sides having a barbed end having a forward-pointing tip, the other of said sides of each of said hooks defining an elongated shank extending in a direction opposite to the convex side of said curved portion, said shanks being alongside each other, means rigidly interconnecting said shanks, said curved portions both extending upwardly from said shanks at the same time, and at said same time the centers of said curved portions being disposed on opposite sides of a reference plane extending along said shanks and substantially through a center of the area in which said shanks are disposed, said forward-pointing tip of said forward hook being disposed a substantial distance forwardly of said forward-pointing tip of said rearward hook, said means rigidly interconnecting said shanks comprising a weighting member of substantially greater weight in proportion to its forward-to-rearward dimension than the combined weight of said two shanks along an equal forward-to-rearward dimension along the two of said shanks, the forward ends of said hook shanks terminating in aligned eyes inside said weighting member, a wire extending through said aligned eyes, and said wire having an eye thereon external of said weighting member.

2. The tandem fish hook of claim 1 having a construction such that when said hooks extend upwardly from said shanks said wire eye is disposed in an eye position at least as high as said shanks whereby said hooks tend to remain upwardly extending as said tandem hooks is pulled by said wire eye.

3. The tandem fish hook of claim 1 having said wire eye being above said shanks.

4. A tandem fish hook assembly comprising a forward hook and a rearward hook, said hooks each having two opposite sides connected by a curved portion with a convex side and a center, one of said sides having a barbed end having a forward-pointing tip, the other of said sides of each of said hooks defining an elongated shank extending in a direction opposite to the convex side of said curved portion, said shanks being alongside each other, means rigidly interconnecting said shanks, said curved portions both extending upwardly from said shanks at the same time, and at said same time the centers of said curved portions being disposed on opposite sides of a reference plane extending along said shanks and substantially through a center of the area in which said shanks are disposed, said forward-pointing tip of said forward hook being disposed a substantial distance forwardly of said forward-pointing tip of said rearward hook, said means rigidly interconnecting said shanks comprising a weighting member of substantially greater weight in proportion to its forward-to-rearward dimension than the combined weight of said two shanks along an equal forward-to-rearward dimension along the two of said shanks, an eye means being external of and connected to said weighting member, said eye means being formed of the same piece of material as one of said hooks, the shank of said one hook having an upwardly offset portion inside said weighting means, the other of said hook shanks having an eye on its forward end surrounding said offset portion and being internal of said weighting member.

5. A tandem fish hook assembly comprising a forward hook and a rearward hook, said hooks each having two opposite sides connected by a curved portion with a convex side and a center, one of said sides having a barbed end having a forward-pointing tip, the other of said sides of each of said hooks defining an elongated shank extending in a direction opposite to the convex side of said curved portion, said shanks being alongside each other, means rigidly interconnecting said shanks, said curved portions both extending upwardly from said shanks at the same time, and at said same time the centers of said curved portions being disposed on opposite sides of a reference plane extending along said shanks and substantially through a center of the area in which said shanks are disposed, said forward-pointing tip of said forward hook being disposed a substantial distance forwardly of said forward-pointing tip of said rearward hook, said means rigidly interconnecting said shanks comprising a weighting member of substantially greater weight in proportion to its forward-to-rearward dimension than the combined weight of said two shanks along an equal forward-to-rearward dimension along the two of said shanks, said forward hook having an eye means being external of, connected to and forward of said weighting member, said forward hook eye means being formed of the same piece of material as the forward hook, said rearward hook having an eye means external of, connected to and forward of said weighting member, said rearward hook eye means being formed of the same piece of material as said rearward hook.

* * * * *